US012705970B2

(12) United States Patent
Iwasaki et al.

(10) Patent No.: US 12,705,970 B2
(45) Date of Patent: Aug. 11, 2026

(54) CARGO COMPARTMENT MONITORING DEVICE AND CARGO COMPARTMENT MONITORING METHOD

(71) Applicant: Nissan Motor Co., Ltd., Kanagawa (JP)

(72) Inventors: Eijo Iwasaki, Kanagawa (JP); Yutaka Mikuriya, Kanagawa (JP); Kotaro Chiba, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/863,444

(22) PCT Filed: Mar. 15, 2023

(86) PCT No.: PCT/IB2023/000112
§ 371 (c)(1),
(2) Date: Nov. 6, 2024

(87) PCT Pub. No.: WO2023/218236
PCT Pub. Date: Nov. 16, 2023

(65) Prior Publication Data
US 2025/0299553 A1 Sep. 25, 2025

(30) Foreign Application Priority Data
May 10, 2022 (JP) ................................ 2022-077535

(51) Int. Cl.
*G08B 21/24* (2006.01)
*G06T 7/70* (2017.01)

(52) U.S. Cl.
CPC ................ *G08B 21/24* (2013.01); *G06T 7/70* (2017.01); *G06T 2207/30268* (2013.01)

(58) Field of Classification Search
CPC . G08B 21/24; G06T 7/70; G06T 2207/30268; G01G 19/12; G06Q 10/087;
(Continued)

(56) References Cited

U.S. PATENT DOCUMENTS 9,616,773 B2 * 4/2017 Bradley .................. E05F 15/70
10,708,722 B1 * 7/2020 Klinkner .................. G01S 5/02
(Continued)

FOREIGN PATENT DOCUMENTS

JP 2001-285842 A 10/2001
JP 2005-157507 A 6/2005
(Continued)

*Primary Examiner* — Eric Blount
(74) *Attorney, Agent, or Firm* — Osha Bergman Watanabe & Burton LLP

(57) ABSTRACT

A cargo compartment monitoring device and a cargo compartment monitoring method acquire cargo information including at least information indicating a position of a cargo loaded in a cargo compartment of a vehicle in the cargo compartment, via an acquiring unit, record the cargo information related to the cargo newly loaded on the vehicle in association with a user when the new user boards the vehicle, determine whether the cargo information has been updated, determines whether the vehicle has arrived at a destination point of the user, and notify a first alert via the notifying unit in a case of determining that the cargo information has not been updated and the vehicle has arrived at the destination point.

19 Claims, 5 Drawing Sheets

(58) Field of Classification Search
CPC .... G06Q 10/08; G06Q 50/40; G06Q 10/0833; G06V 20/52; G06V 20/59; G08G 1/205
USPC ...................................................... 340/539.2
See application file for complete search history.

(56) References Cited

U.S. PATENT DOCUMENTS

| | | | | |
|---|---|---|---|---|
| 11,200,435 | B1 * | 12/2021 | Scanlon | G05D 1/0094 |
| 11,200,530 | B2 * | 12/2021 | Salter | G06Q 10/08 |
| 11,594,046 | B2 * | 2/2023 | Dingli | G06Q 20/102 |
| 2005/0237196 | A1 | 10/2005 | Matsukawa et al. | |
| 2016/0332535 | A1 | 11/2016 | Bradley et al. | |
| 2020/0224466 | A1 * | 7/2020 | Kamata | G07C 9/00571 |
| 2021/0073726 | A1 | 3/2021 | Okodo et al. | |

FOREIGN PATENT DOCUMENTS

| | | | |
|---|---|---|---|
| JP | 2007-164813 | A | 6/2007 |
| JP | 2017-182301 | A | 10/2017 |
| JP | 2019-046271 | A | 3/2019 |
| JP | 2020-111990 | A | 7/2020 |
| JP | 2021011328 | A | 2/2021 |
| JP | 2021042028 | A | 3/2021 |

* cited by examiner

CARGO COMPARTMENT MONITORING DEVICE AND CARGO COMPARTMENT MONITORING METHOD

TECHNICAL FIELD

The present invention relates to a cargo compartment monitoring device and a cargo compartment monitoring method.

BACKGROUND ART

A cargo locking device has been proposed, wherein the cargo locking device controls a cargo locking mechanism in a cargo compartment of a vehicle, and unlocks the cargo locking mechanism that stores the cargo of an user who has arrived at a destination when the vehicle arrives at the destination of the user, in order to reduce the effort required for the user to remove the cargo when getting off the vehicle (Patent Literature 1).

CITATION LIST

Patent Literature

Patent Literature 1: Japanese Patent Laid-Open Publication No. 2020-111990

SUMMARY OF INVENTION

Technical Problem

According to Patent Literature 1, the position where the user can place the cargo is limited to the vicinity of the locking mechanism, and the space in the cargo compartment where the cargo can be arranged is limited. Therefore, there is a problem in that the user cannot freely arrange the cargo in the cargo compartment depending on the type, size, etc. of the cargo.

The present invention has been made in view of the above problems. An object of the present invention is to provide a cargo compartment monitoring device and a cargo compartment monitoring method that can reduce restrictions on the space available for arranging cargo in the cargo compartment of a vehicle, and can allow users to freely arrange cargo in the cargo compartment depending on the type and size of the cargo etc.

Solution to Problem

In order to solve the above-described problems, a cargo compartment monitoring device and a cargo compartment monitoring method, according to an aspect of the present invention, acquire cargo information including at least information indicating a position of a cargo loaded in a cargo compartment of a vehicle in the cargo compartment, via an acquiring unit, record the cargo information related to the cargo newly loaded on the vehicle in association with a user when the new user boards the vehicle, determine whether the cargo information has been updated, determines whether the vehicle has arrived at a destination point of the user, and notify a first alert via the notifying unit in a case of determining that the cargo information has not been updated and the vehicle has arrived at the destination point.

Advantageous Effects of Invention

According to the present invention, it is possible to reduce restrictions on the space available for arranging cargo in the cargo compartment of a vehicle, and can allow users to freely arrange cargo in the cargo compartment depending on the type and size of the cargo etc.

DESCRIPTION OF EMBODIMENTS

Figure 1:
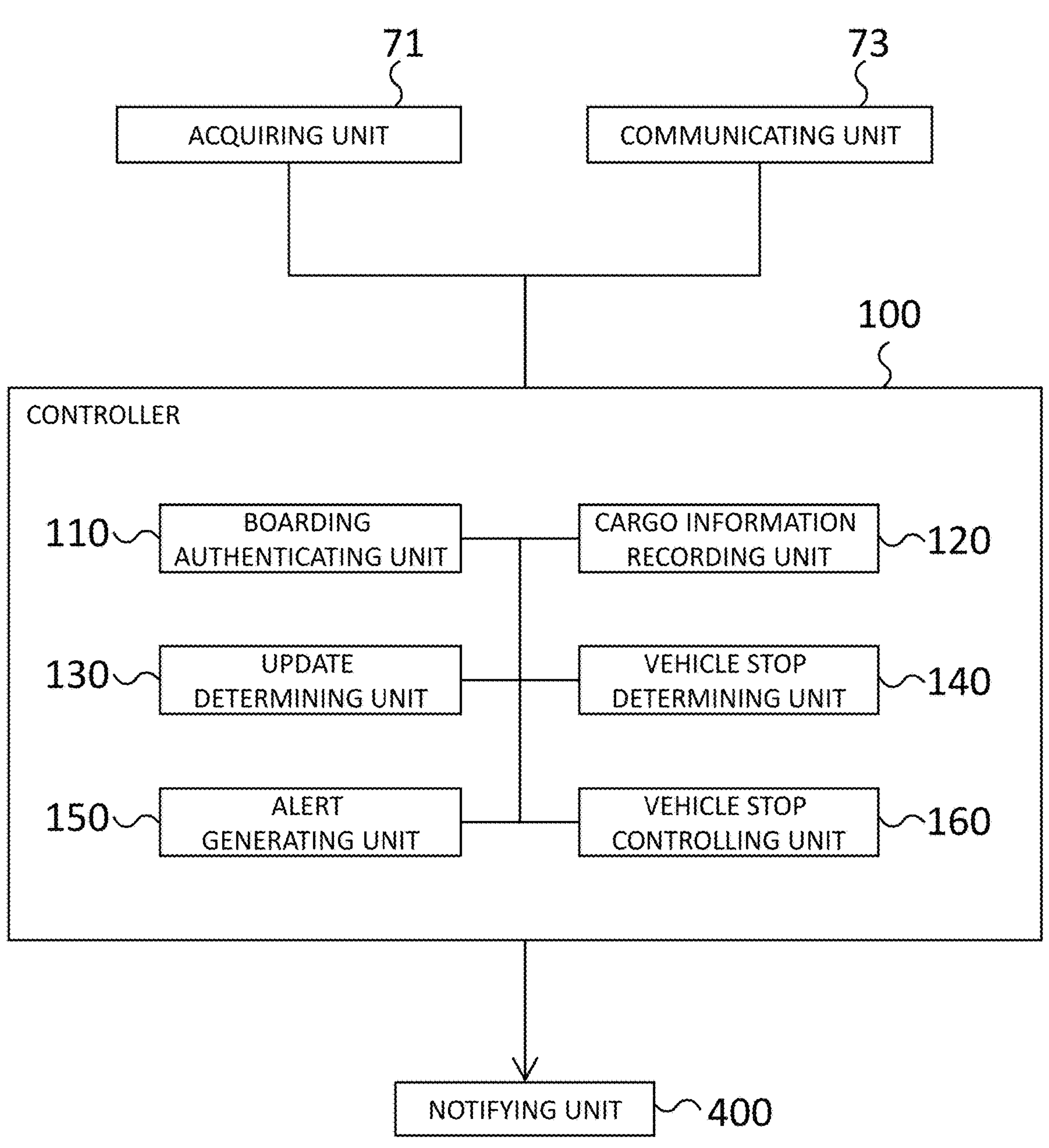
FIG. 1 is a block diagram illustrating a configuration of a cargo compartment monitoring device according to the embodiment of the present invention.

Hereinafter, embodiments of the present invention will be described with reference to the drawings. In the description of the drawings, the same items are designated by the same reference numerals and duplicate description will be omitted.

Configuration of Cargo Compartment Monitoring Device

FIG. 1 is a block diagram illustrating a configuration of a cargo compartment monitoring device according to the present embodiment. As shown in FIG. 1, the cargo compartment monitoring device according to the present embodiment includes an acquiring unit 71, a communicating unit 73, a controller 100, and a notifying unit 400. The controller 100 is connected to the acquiring unit 71, the communicating unit 73, and the notifying unit 400 via a wired or wireless communication path.

Here, the cargo compartment monitoring device is mounted on a vehicle (not shown). For example, the cargo compartment monitoring device is installed in a vehicle (allocated vehicle) that is managed by a vehicle allocation service. The vehicle allocation service acquires requests from users, vehicle information, etc., and determines the vehicle to be allocated based on the acquired information.

The request from the user is a request indicating the user's request to use the vehicle. The request includes information indicating the departure point and the destination point of the vehicle. For example, in a case where the user wishes to travel by boarding a vehicle, the request may include information indicating the user's boarding point and alighting point for the vehicle as the departure point and destination point of the vehicle.

The vehicle is a vehicle that provides a means of transportation from the departure point to the destination point, specified by the request, and includes, for example, an autonomous vehicle. Other examples of vehicles include various means of transportation, such as manned/unmanned taxis, buses, and trucks. Vehicle is not limited to the examples listed here.

In addition, the vehicle is equipped with a cargo compartment in which the cargo carried by the user can be loaded. The cargo compartment may be, for example, a cargo loading facility with a fence around it in a commercial vehicle, or a baggage room such as a trunk in a passenger car. The cargo compartments are not limited to the examples listed here.

The cargo compartment monitoring device according to the present embodiment monitors the cargo compartment provided in the vehicle to prevent cargo loaded in the cargo compartment from being taken away by a user other than the user who owns the cargo. Furthermore, it prevents the cargo loaded in the cargo compartment from being left unloaded by the user who owns the cargo. That is, the cargo compartment monitoring device according to the present embodiment manages the relationship between the cargo loaded in the cargo compartment and the user using the vehicle.

The acquiring unit 71 acquires cargo information including at least information indicating the position in the cargo compartment of the cargo loaded in the cargo compartment of the vehicle.

Figure 5:
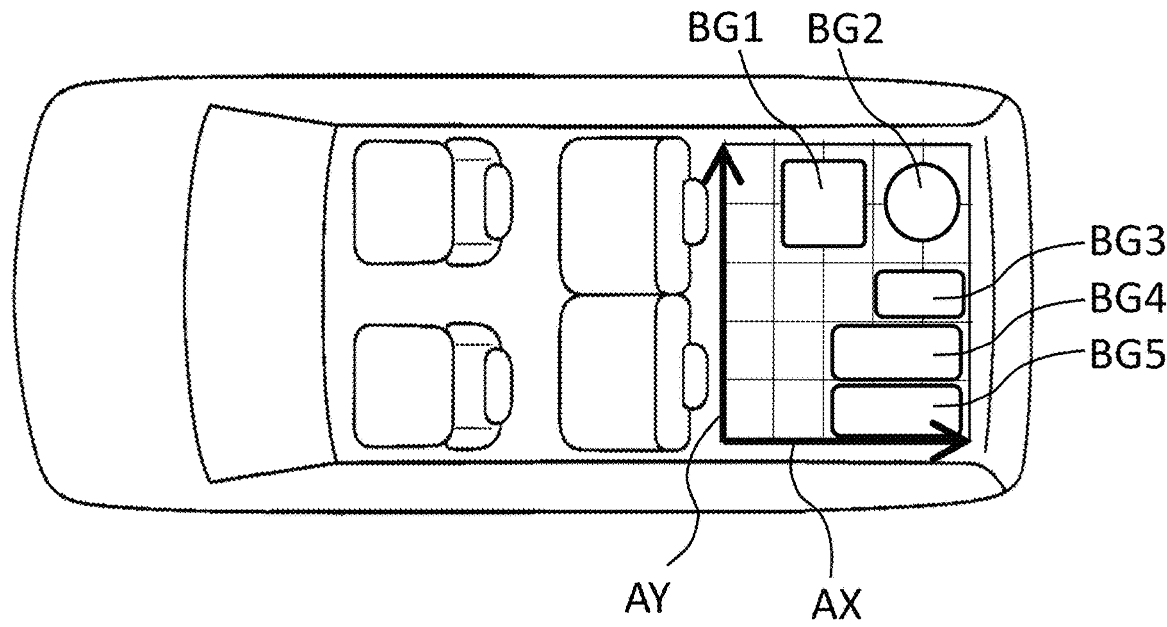
FIG. 5 is a plan view illustrating an example of the cargo compartment loaded with cargo.

The acquiring unit 71 may have multiple load detecting sensors arranged on the floor of the cargo compartment, and may acquire information indicating the position of the cargo in the cargo compartment based on the load distribution on the floor acquired by the load detecting sensors. FIG. 5 is a plan view illustrating an example of the cargo compartment loaded with cargo. FIG. 5 shows cargoes BG1 to BG5 being loaded on the floor of the cargo compartment. By arranging multiple load detecting sensors in a grid on the floor of the cargo compartment, the acquiring unit 71 may detect the positions of cargoes BG1 to BG5 on the floor of the cargo compartment as numerical values of coordinates AX and AY.

Figure 6:
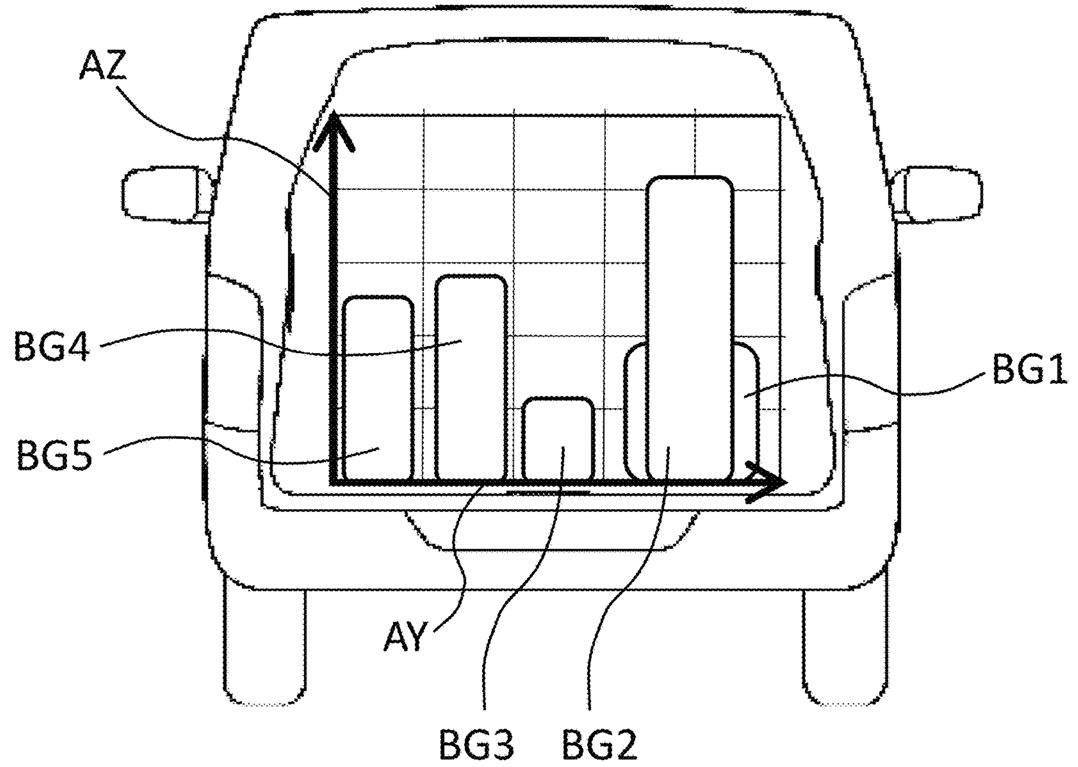
FIG. 6 is a rear view illustrating an example of the cargo compartment loaded with cargo.

The acquiring unit 71 may have an infrared sensor, an ultrasonic sensor, etc., and may acquire information indicating the position of the cargo in the cargo compartment as well as information indicating the height of the cargo from the floor of the cargo compartment. FIG. 6 is a rear view illustrating an example of the cargo compartment loaded with cargo. Corresponding to FIG. 5, FIG. 6 shows cargoes BG1 to BG5 being loaded on the floor of the cargo compartment. The acquiring unit 71 may detect the heights of cargoes BG1 to BG5 on the floor of the cargo compartment as numerical values of coordinates AZ.

In addition, the acquiring unit 71 may have a camera that takes an image of the inside of the cargo compartment and generates a captured image, and may acquire information indicating the position of the cargo within the cargo compartment through image analysis based on the captured image. For example, the camera is installed above the cargo compartment so that it can image the entire floor of the cargo compartment. The acquiring unit 71 may compare the image captured by the camera before the cargo is loaded into the cargo compartment with the image captured after the cargo is loaded into the cargo compartment, and may acquire information indicating the position of the cargo loaded in the cargo compartment. Further, the acquiring unit 71 may acquire information indicating the height of the cargo loaded in the cargo compartment using a camera that images the cargo compartment from the side.

In cases where the cargo compartment consists of multiple shelves, the acquiring unit 71 may be provided for each shelf. In this case, for each cargo, the acquiring unit 71 may acquire information indicating the position of the cargo on the loading surface of the shelf and information indicating the height of the cargo from the loading surface.

In addition, the acquiring unit 71 may acquire return information indicating that the cargo has returned to the vehicle. More specifically, when the latest cargo information cannot be acquired for a cargo whose cargo information is registered, the acquiring unit 71 determines that the cargo has been taken out of the cargo compartment. When it is determined that the cargo has been taken out of the cargo compartment, the acquiring unit 71 may receive an instruction from the user indicating that the cargo has returned to the vehicle as return information. Note that the acquiring unit 71 may receive the instruction via an input device (not shown) or the like.

In addition, when it is determined that the cargo has been removed from the cargo compartment, the acquiring unit 71 may determine whether it is now possible to acquire the latest cargo information for the cargo for which cargo information has been registered. More specifically, the acquiring unit 71 may detect the characteristics of the cargo, such as its weight, shape, pattern, and color of the cargo, and may determine whether the cargo whose cargo information has been registered has been loaded into the cargo compartment again. Then, when it is determined that the cargo has been loaded into the cargo compartment again, the acquiring unit 71 may generate (acquire) return information.

The communicating unit 73 connects to a server that provides an external vehicle allocation service and acquires requests from users. In particular, the communicating unit 73 acquires first identification information for identifying the user who requested the vehicle and information indicating the user's destination point (destination point information).

For example, the first identification information may be information that identifies the user's terminal from which the request was sent, or may be the user's characteristics acquired through the user's terminal (including physical characteristic patterns such as fingerprints, iris, veins, face, etc.). In addition, first identification information may be information linked to an authentication card owned by the user. Further, the information indicating the destination point of the user includes information indicating the position of the destination point (destination point position information).

Additionally, the communicating unit 73 acquires information indicating the position of the vehicle (vehicle position information) from a position identifying device (not shown) mounted on the vehicle. For example, the position identifying device is a GPS receiver mounted on the vehicle. The GPS receiver detects vehicle position information on the ground by receiving radio waves from artificial satellites. The vehicle position information detected by the GPS receiver includes latitude information and longitude information.

Note that the method by which the position identifying device detects vehicle position information is not limited to the method using the GPS receiver. For example, position may be estimated using a method called odometry. Odometry is a method of estimating the position of the vehicle by determining the amount and direction of movement of the vehicle according to the rotation angle and rotational angular velocity of the vehicle.

Further, the communicating unit 73 acquires second identification information for identifying the user boarding in the vehicle from an authentication device (not shown) mounted on the vehicle.

For example, the second identification information may be information acquired through the authentication device, that identifies the terminal of the user boarding the vehicle, or the user's characteristics acquired through the authentication device (including physical characteristic patterns such as fingerprints, iris, veins, face, etc.). In addition, the second identification information may be information linked to an authentication card owned by the user.

The notifying unit 400 notifies various alerts based on the determination results of the controller 100, which will be described later. The notifying unit 400 receives information from the controller 100 and presents various information.

For example, the notifying unit 400 may notify various alerts as visual information using a display, flashing lights, etc. Further, the notifying unit 400 may notify various alerts as auditory information using a speaker or the like. Further, the notifying unit 400 may generate vibrations and may notify the user of various alerts by stimulating the vibrations. The notifying unit 400 is not limited to the examples listed here.

Next, various alerts notified by the notifying unit 400 will be explained. The notifying unit 400 may notify a first alert when the controller 100 determines that the cargo information has not been updated and the vehicle has arrived at the destination point. Note that the first alert indicates that the cargo is abandoned, and the notifying unit 400 notifies the first alert to the external of the vehicle.

Furthermore, when the controller 100 determines that the cargo information has not been updated and the current time is after a notification start time, the notifying unit 400 may notify the first alert. Here, the notification start time indicates a time earlier than the scheduled time when the vehicle arrives at the destination point by the predetermined time.

Furthermore, when the controller 100 determines that the cargo information has been updated and the vehicle has not arrived at the destination point, the notifying unit 400 may notify a second alert. Note that the second alert indicates that the cargo has moved, and the notifying unit 400 notifies the second alert to the internal of the vehicle.

In addition, the notifying unit 400 may notify a third alert when the controller 100 determines that the cargo information has not been updated within the stop time of the vehicle, which is set when the vehicle arrives at the user's destination point. Note that the third alert indicates that the cargo is abandoned, and the notifying unit 400 may notify the third alert via the user's terminal.

Furthermore, when the controller 100 determines that the cargo information has been updated and the vehicle has stopped at a location other than the destination point, the notifying unit 400 may notify a fourth alert. Note that the fourth alert indicates that the cargo has moved. Further, when the return information is acquired by the acquiring unit 71, the notifying unit 400 may stop issuing the fourth alert upon receiving an instruction from the controller 100.

The controller 100 (an example of a control unit or a processing unit) is a general-purpose computer that includes a CPU (central processing unit), memory, and an input/output unit. A computer program (cargo compartment monitoring program) is installed in controller 100 to function as part of a cargo compartment monitoring device. By executing the computer program, the controller 100 functions as a plurality of information processing circuits (110, 120, 130, 140, 150, 160) included in the cargo compartment monitoring device.

Here, an example will be shown in which a plurality of information processing circuits (110, 120, 130, 140, 150, 160) included in the cargo compartment monitoring device are realized by software. However, it is also possible to configure the information processing circuits (110, 120, 130, 140, 150, 160) by preparing dedicated hardware for executing each information processing described below. Furthermore, the plurality of information processing circuits (110, 120, 130, 140, 150, 160) may be configured with separate hardware.

The controller 100 includes a plurality of information processing circuits (110, 120, 130, 140, 150, 160), including a boarding authenticating unit 110, a cargo information recording unit 120, an update determining unit 130, a vehicle stop determining unit 140, an alert generating unit 150, and a vehicle stop controlling unit 160.

The boarding authenticating unit 110 authenticates a user who attempts to board the vehicle. More specifically, the boarding authenticating unit 110 determines whether or not the first authentication information and the second authentication information match, and if they match, the boarding authenticating unit 110 allows a user who wishes to board the vehicle to board the vehicle. In addition, the boarding authenticating unit 110 may be one that opens the entrance to the vehicle when allowing the user to board the vehicle, and furthermore, the one that opens the entrance for loading/unloading the cargo compartment of the vehicle. The boarding authenticating unit 110 may instruct the user to load cargo belonging to the user.

Further, the boarding authenticating unit 110 may determine whether a new user has boarded the vehicle. More specifically, the boarding authenticating unit 110 may determine that the user has boarded the vehicle from the entrance/exit of the vehicle after allowing the user to board the vehicle, based on information from an obstacle sensor (not shown), etc. In addition, the boarding authenticating unit 110 may determine that the user has boarded the vehicle based on instructions from the user.

When the new user boards the vehicle, the cargo information recording unit 120 records cargo information related to the newly loaded cargo on the vehicle in association with the user. More specifically, when it is determined that the new user has boarded the vehicle, the cargo information recording unit 120 records the acquired user information (the first identification information or the second identification information) and cargo information as a set. As a result, it is possible to record the position of the corresponding cargo in the cargo compartment for each user in the vehicle.

Note that the cargo information recording unit 120 may record a captured image obtained by imaging the inside of the cargo compartment in association with the cargo information and the user. For example, the cargo information recording unit 120 may record the acquired first identification information, the cargo information, and the captured image as a set.

The update determining unit 130 repeatedly acquires the cargo information of the cargo loaded in the cargo compartment via the acquiring unit 71. Then, the update determining unit 130 compares the acquired cargo information with the cargo information recorded in association with the user to determine whether the latest cargo information has been updated.

Furthermore, the update determining unit 130 may determine that the cargo information has been updated when the position (including height) of the cargo in the cargo compartment changes by a predetermined value or more based on the cargo's position information. Additionally, the update determining unit 130 may determine that the cargo information has been updated when the latest cargo information regarding the cargo to be determined cannot be acquired due to reasons such as the cargo being removed from the cargo compartment.

In addition, the update determining unit 130 may determine whether the cargo information has been updated within the stop time of the vehicle that is set when the vehicle arrives at the user's destination point.

The vehicle stop determining unit 140 determines whether the vehicle has arrived at the user's destination point. For example, the vehicle stop determining unit 140 acquires the speed of the vehicle based on a speed sensor (not shown) or the like, and determines that the vehicle is stopped when the speed of the vehicle is less than a predetermined speed.

Further, the vehicle stop determining unit 140 determines whether the vehicle is stopped at the destination point based on the destination point position information and the vehicle position information. For example, the vehicle stop determining unit 140 determines that the vehicle is stopped at the destination point when the vehicle is stopped at the destination point or its surrounding area. Here, the surrounding area is a range where the distance to the destination point is less than or equal to the predetermined distance. The predetermined distance may be set in advance, or may be set as appropriate depending on the driving scene of the vehicle.

Furthermore, the vehicle stop determining unit 140 may determine whether the vehicle is stopped at a location other than the destination point based on the destination point position information and the vehicle position information. For example, the vehicle stop determining unit 140 may determine that the vehicle is not stopped at the destination point when the vehicle is not positioned at the destination point and its surrounding area.

Furthermore, the vehicle stop determining unit 140 may determine whether the current time is after the notification start time, where the notification start time is a time earlier than the scheduled time at which the vehicle arrives at the destination point by the predetermined time. Here, the vehicle stop determining unit 140 may acquire the scheduled time for the vehicle to arrive at the destination point from a server that provides an external vehicle allocation service, or the vehicle stop determining unit 140 may itself calculate the scheduled time based on the travel plan of the vehicle.

The alert generating unit 150 generates various alerts that are notified by the notifying unit 400. The various generated alerts are output to the notifying unit 400.

If it is determined that the cargo information is not updated and the vehicle has arrived at the destination point, the alert generating unit 150 generates the first alert. Further, the alert generating unit 150 may generate the first alert when it is determined that the cargo information is not updated and the current time is after the notification start time.

Further, the alert generating unit 150 may generate the second alert when it is determined that the cargo information is updated and the vehicle has not arrived at the destination point.

Additionally, the alert generating unit 150 may generate the third alert when it is determined that the cargo information has not been updated within the stop time of the vehicle that is set when the vehicle arrives at the user's destination point.

Further, the alert generating unit 150 may generate the fourth alert when it is determined that the cargo information is updated and the vehicle is stopped at a location other than the destination point.

The vehicle stop controlling unit 160 sets a stop time for maintaining the stopped state of the vehicle when it is determined that the vehicle has arrived at the destination point. Then, the vehicle stop controlling unit 160 maintains the stopped state of the vehicle for the set stop time. Note that when it is determined that the cargo information has been updated, the vehicle stop controlling unit 160 sets a first stop time as the stop time. On the other hand, if it is determined that the cargo information has not been updated, the vehicle stop controlling unit 160 may set a second stop time, which is longer than the first stop time, as the stop time.

Note that when it is determined that the cargo information is updated and the vehicle is stopped at a location other than the destination point, the vehicle stop controlling unit 160 may maintain the stopped state of the vehicle. Further, the vehicle stop controlling unit 160 may cancel the stopped state of the vehicle when the cargo information is not updated during the second stop time.

Furthermore, the vehicle stop controlling unit 160 may cancel the stopped state of the vehicle when the acquiring unit 71 acquires return information.

Cargo Registration Process

Figure 2:
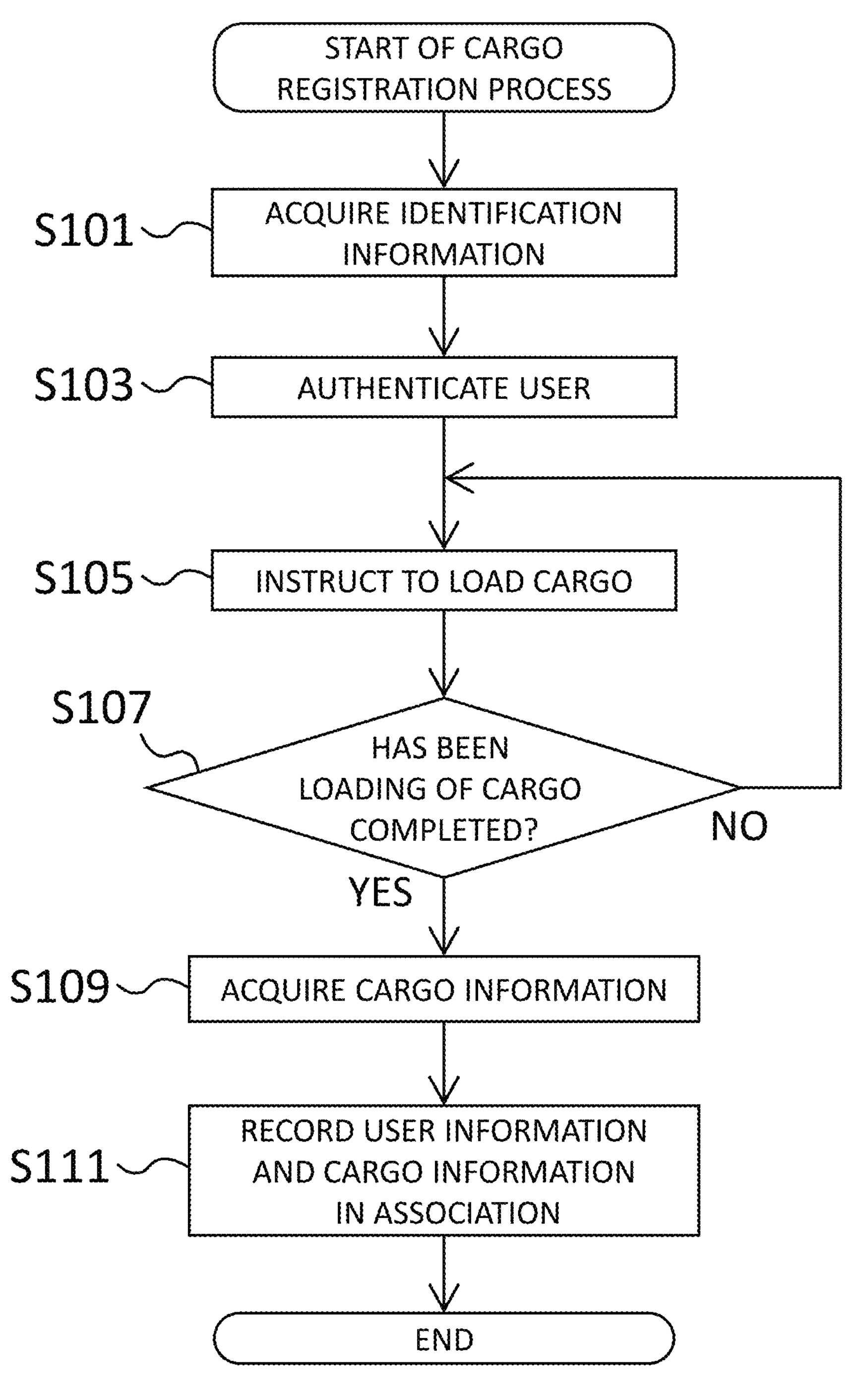
FIG. 2 is a flowchart illustrating a cargo registration process of the cargo compartment monitoring device according to the embodiment of the present invention.

FIG. 2 is a flowchart illustrating a cargo registration process of the cargo compartment monitoring device according to the present embodiment. The cargo registration process shown in FIG. 2 starts when the vehicle that has received the request from the user stops at the user's boarding point.

In step S101, the communicating unit 73 acquires the first identification information that identifies the user who requested the vehicle, and the second identification information that identifies the user who boards the vehicle.

In step S103, the boarding authenticating unit 110 authenticates the user who intends to board the vehicle.

In step S105, the boarding authenticating unit 110 instructs the user to load cargo belonging to the user.

In step S107, the cargo information recording unit 120 determines whether loading of cargo by the user has been completed. More specifically, it may be determined that cargo loading by the user has been completed based on an instruction from the user or based on the fact that movement within the cargo compartment can no longer be detected after a predetermined time has elapsed.

If it is determined that loading of the cargo by user has not been completed (NO in step S107), the process returns to step S105.

On the other hand, if it is determined that loading of the cargo by the user has been completed (YES in step S107), the acquiring unit 71 acquires cargo information in step S109.

In step S111, when a new user gets on the vehicle, the cargo information recording unit 120 records the cargo information related to the cargo newly loaded on the vehicle in association with the user information (the first identification information or the second identification information).

Monitoring process (before arrival at the destination point)

Figure 3:
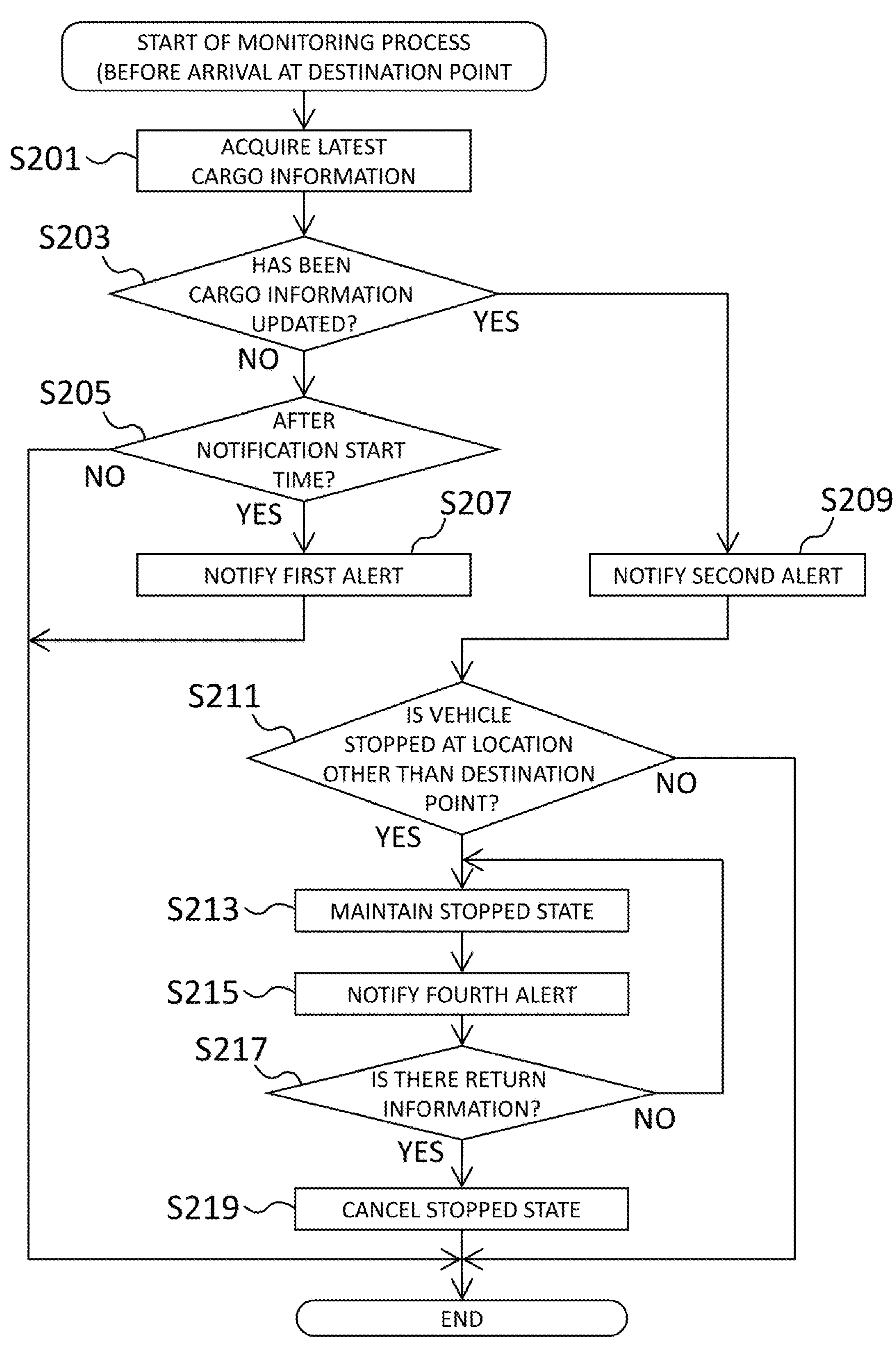
FIG. 3 is a flowchart illustrating a monitoring process (before arrival at the destination point) of the cargo compartment monitoring device according to the embodiment of the present invention.

FIG. 3 is a flowchart illustrating a monitoring process (before arrival at the destination point) of the cargo compartment monitoring device according to the present embodiment. The monitoring process shown in FIG. 3 is executed in a period before the vehicle arrives at the user's destination point, and is repeatedly executed at a predetermined cycle.

In step S201, the acquiring unit 71 acquires the latest cargo information for the cargo whose cargo information has been registered.

In step S203, the update determining unit 130 compares the acquired cargo information with the cargo information recorded in association with the user information to determine whether the latest cargo information has been updated.

If it is determined that the cargo information has not been updated (NO in step S203), the vehicle stop determining unit 140 determines in step S205 whether the current time is after the notification start time.

If the current time is after the notification start time (YES in step S205), the notifying unit 400 notifies the first alert in step S207. Thereafter, the monitoring process shown in FIG. 3 is ended. On the other hand, if the current time is earlier than the notification start time (NO in step S205), the monitoring process in FIG. 3 is ended.

If it is determined that the cargo information has been updated (YES in step S203), the notifying unit 400 notifies the second alert in step S209.

In step S211, the vehicle stop determining unit 140 determines whether the vehicle is stopped at a location other than the destination point. If the vehicle is not stopped at a location other than the destination point (NO in step S211), that is, if the vehicle is not stopped or if the vehicle is stopped at the destination point, the monitoring process in FIG. 3 ends.

If the vehicle is stopped at a location other than the destination point (YES in step S211), the vehicle stop controlling unit 160 maintains the stopped state of the vehicle in step S213. Then, in step S215, the notifying unit 400 notifies the fourth alert.

In step S217, the vehicle stop controlling unit 160 determines whether the acquiring unit 71 has acquired the return information. If it is determined that the return information has been acquired (YES in step S217), the vehicle stop controlling unit 160 cancels the stopped state of the vehicle in step S219, and then ends the monitoring process in FIG. 3. On the other hand, if it is determined that return information has not been acquired (NO in step S217), the process returns to step S213.

Monitoring Process (after Arrival at the Destination Point)

Figure 4:
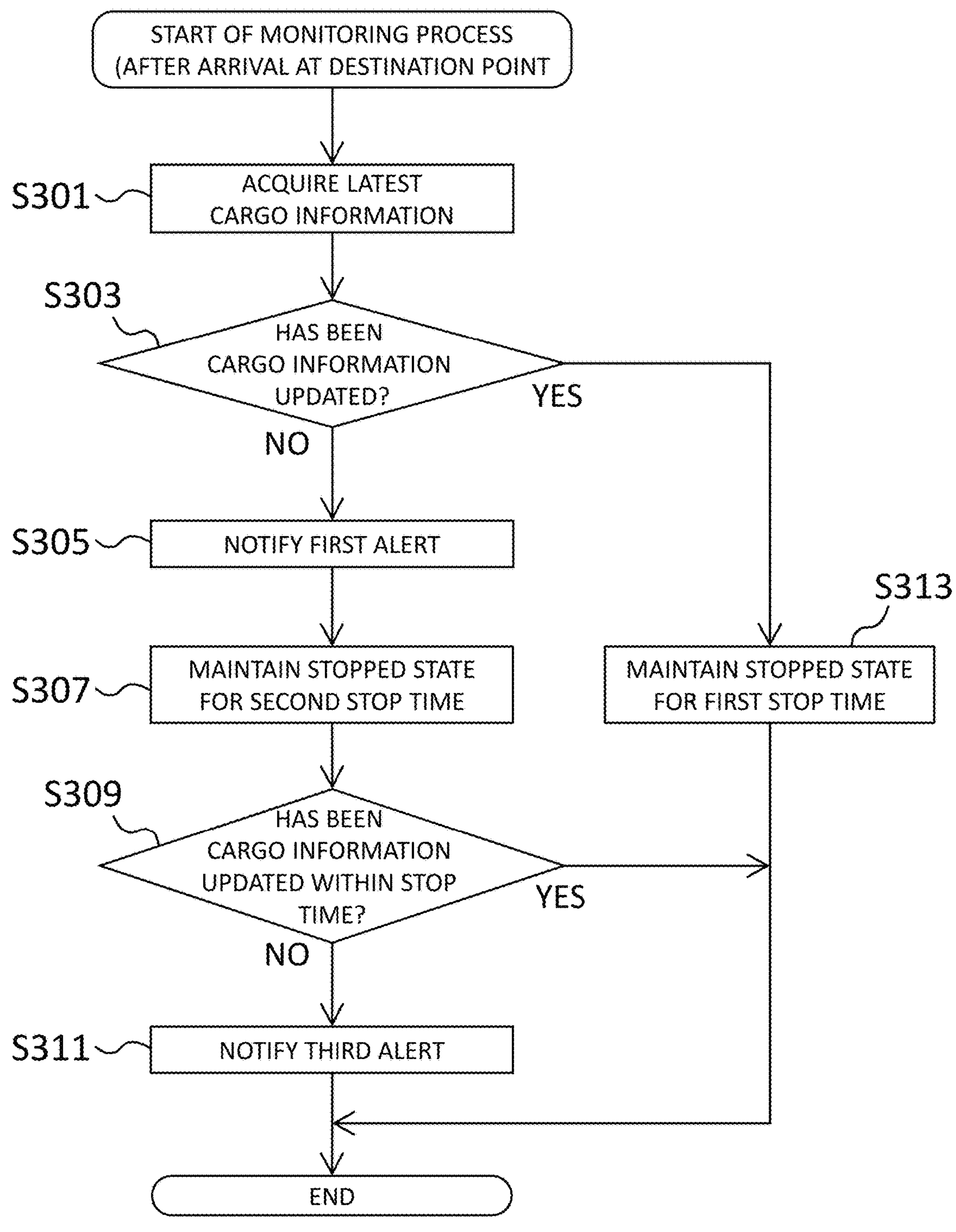
FIG. 4 is a flowchart illustrating a monitoring process (after arrival at the destination point) of the cargo compartment monitoring device according to the embodiment of the present invention.

FIG. 4 is a flowchart illustrating a monitoring process (after arrival at the destination point) of the cargo compartment monitoring device according to the present embodiment. The monitoring process shown in FIG. 4 is executed in a period after the vehicle arrives at the user's destination point.

In step S301, the acquiring unit 71 acquires the latest cargo information for the cargo whose cargo information has been registered.

In step S303, the update determining unit 130 compares the acquired cargo information with the cargo information recorded in association with the user to determine whether the latest cargo information has been updated.

If it is determined that the cargo information has been updated (YES in step S303), the vehicle stop controlling unit 160 maintains the stopped state of the vehicle for the first stop time in step S313. Thereafter, the monitoring process shown in FIG. 4 is ended.

If it is determined that the cargo information has not been updated (NO in step S303), the notifying unit 400 notifies the first alert in step S305. Thereafter, in step S307, the vehicle stop controlling unit 160 maintains the stopped state of the vehicle for the second stop time.

In step S309, the update determining unit 130 determines whether the cargo information has been updated within the stop time of the vehicle.

If it is determined that the cargo information has been updated within the stop time (YES in step S309), the monitoring process in FIG. 4 is ended. On the other hand, if it is determined that the cargo information has not been updated within the stop time (NO in step S309), the notifying unit 400 notifies the third alert in step S311.

EFFECT OF EMBODIMENTS

As explained in detail above, a cargo compartment monitoring device and a cargo compartment monitoring method, according to the present embodiment, acquire cargo information including at least information indicating a position of a cargo loaded in a cargo compartment of a vehicle in the cargo compartment, via an acquiring unit, record the cargo information related to the cargo newly loaded on the vehicle in association with a user when the new user boards the vehicle, determine whether the cargo information has been updated, determines whether the vehicle has arrived at a destination point of the user, and notify a first alert via the notifying unit in a case of determining that the cargo information has not been updated and the vehicle has arrived at the destination point.

As a result, it is possible to reduce restrictions on the space available for arranging cargo in the cargo compartment of a vehicle, and can allow users to freely arrange cargo in the cargo compartment depending on the type and size of the cargo etc. Therefore, user convenience improves.

In particular, there is no need for a locking mechanism to prevent the cargo loaded in the cargo compartment from being taken away by a user other than the user who owns the cargo, thus, restrictions can be reduced, where restrictions are on the space in which cargo can be arranged. Furthermore, since there are no restrictions due to the locking mechanism, the user can freely arrange the cargo in the cargo compartment depending on the type and size of the cargo.

Additionally, it is possible to prevent a situation in which cargo loaded in the cargo compartment is left unloaded by the user who owns the cargo.

Further, the cargo compartment monitoring device and the cargo compartment monitoring method, according to the present embodiment, may notify the first alert to an external of the vehicle, via the notifying unit. This increases the possibility that a user who gets off the vehicle will notice that the cargo associated with the user is left in the vehicle.

Furthermore, in the cargo compartment monitoring device and the cargo compartment monitoring method, according to the present embodiment, the first alert indicates that the cargo is abandoned. This allows the user who gets off the vehicle to be aware that the cargo associated with the user is left in the vehicle.

Further, the cargo compartment monitoring device and the cargo compartment monitoring method, according to the present embodiment, may determine whether a current time is after a notification start time, where the notification start time is a time earlier than a scheduled time at which the vehicle arrives at the destination point by a predetermined time, and may notify the first alert via the notifying unit in a case of determining that the cargo information has not been updated and the current time is after the notification start time. This allows the user to recognize that the cargo associated with the user is loaded in the cargo compartment and that the cargo needs to be unloaded when getting off the vehicle.

In particular, since the first alert is sent before the vehicle arrives at the destination point, it can prompt the user to prepare for cargo unloading.

Furthermore, the cargo compartment monitoring device and the cargo compartment monitoring method, according to the present embodiment, may notify a second alert via the notifying unit in a case of determining the cargo information has been updated and the vehicle has not arrived at the destination point. This increases the possibility that the user will notice that there has been a change in the cargo associated with the user. For example, the user can notice a situation in which the cargo has fallen over in the cargo compartment, or another user is unloading the cargo from the cargo compartment (a situation in which cargo has been mixed up).

Further, the cargo compartment monitoring device and the cargo compartment monitoring method, according to the present embodiment, may notify the second alert to an internal of the vehicle, via the notifying unit. It is possible to increase the possibility that the user boarding the vehicle will notice that there has been a change in the cargo associated with the user.

Furthermore, in the cargo compartment monitoring device and the cargo compartment monitoring method, according to the present embodiment, the second alert indicates that the cargo has moved. This allows the user boarding the vehicle to recognize that there has been a change in the cargo associated with the user.

Further, the cargo compartment monitoring device and the cargo compartment monitoring method, according to the present embodiment, may maintain a stopped state of the vehicle for a stop time in a case of determining that the vehicle has arrived at the destination point. The second stop time may be set longer than the first stop time, where setting the stop time in a case of determining that the cargo information has been updated as the first stop time, and setting the stop time in a case of determining that the cargo information has not been updated as a second stop time. This allows the user of the vehicle to have time to properly load the cargo into the cargo compartment. For example, it is possible to give the user time to fix the cargo arrangement in the cargo compartment. Also, if a cargo mix-up occurs, it is possible to give the user time to retrieve the cargo.

Furthermore, the cargo compartment monitoring device and the cargo compartment monitoring method, according to the present embodiment, may cancel the stopped state of the vehicle when the cargo information has not been updated during the second stop time, and may notify a third alert via the notifying unit. This increases the possibility that a user who gets out of the vehicle and leaves the vehicle will notice that the cargo linked to the user is left in the vehicle.

Further, in the cargo compartment monitoring device and the cargo compartment monitoring method, according to the present embodiment, the third alert indicates that the cargo is abandoned. This allows a user who has left the vehicle to know that the cargo associated with the user has been left in the vehicle.

Furthermore, the cargo compartment monitoring device and the cargo compartment monitoring method, according to the present embodiment, may notify the third alert via the notifying unit and a terminal of the user. This allows notification content to be communicated to users who have left the vehicle. Even if the user leaves the vehicle, the content of the notification is transmitted to the user, so the user can come and pick up the cargo left in the vehicle at a later date.

Further, the cargo compartment monitoring device and the cargo compartment monitoring method, according to the present embodiment, may determine whether the vehicle is stopped at a location other than the destination point, may maintain the stopped state of the vehicle in a case of determining that the cargo information has been updated and the vehicle is stopped at a location other than the destination point, and notify a fourth alert via the notifying unit. This allows the user of the vehicle to have time to properly load the cargo into the cargo compartment.

Furthermore, in the cargo compartment monitoring device and the cargo compartment monitoring method, according to the present embodiment, the fourth alert indicates that the cargo has moved. This allows, for example, the user time to rearrange the cargo in the cargo compartment. Also, if a cargo mix-up occurs, it is possible to give the user time to retrieve the cargo.

Further, the cargo compartment monitoring device and the cargo compartment monitoring method, according to the present embodiment, may acquire a return information indicating that the cargo has returned to the vehicle, via the acquiring unit, and may cancel the stopped state of the vehicle based on the return information. This allows the vehicle to start traveling after the cargo is properly loaded in the cargo compartment. The vehicle's stopped state is canceled based on the return information, thereby reducing unnecessary stop time.

Furthermore, in the cargo compartment monitoring device and the cargo compartment monitoring method, according to the present embodiment, the acquiring unit may include a plurality of load detecting sensors arranged on a floor of the cargo compartment, and may acquire information indicating the position based on a load distribution on the floor acquired by the load detecting sensors. Therefore, it is possible to acquire the position of cargo in the cargo compartment. In addition, since information on the weight of the cargo can be acquired as cargo information, it is possible to make determination regarding the loading balance of the cargo. As a result, it can contribute to the stability of vehicle running.

Further, in the cargo compartment monitoring device and the cargo compartment monitoring method, according to the present embodiment, the acquiring unit may include a camera configured to capture an image of an inside of the cargo compartment and to generate a captured image, and may acquire information indicating the position by image analysis based on the captured image. This makes it possible to acquire various characteristics of the cargo, such as its weight, shape, pattern, and color.

Furthermore, the cargo compartment monitoring device and the cargo compartment monitoring method, according to the present embodiment, may record the captured image in association with the cargo information and the user. This makes it possible to present an image of the cargo itself associated with the user when notifying various alerts to the user. As a result, it becomes easy for the user to recognize the cargo loaded in the cargo compartment.

Respective functions described in the above embodiment may be implemented by one or plural processing circuits. The processing circuits include programmed processors, electrical circuits, etc., as well as devices such as application specific integrated circuits (ASIC) and circuit components arranged to perform the described functions, etc.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

The present application is based on, and claims priority from Japanese Patent Application No. 2022-077535, filed on May 10, 2022, the entire contents of which are incorporated herein by reference.

REFERENCE SIGNS LIST

71 acquiring unit
73 communicating unit
100 controller
110 boarding authenticating unit
120 cargo information recording unit
130 update determining unit
140 vehicle stop determining unit
150 alert generating unit
160 vehicle stop controlling unit
400 notifying unit

The invention claimed is:

1. A cargo compartment monitoring device comprising an acquiring unit, a controller, and a notifying unit, wherein the acquiring unit is configured to acquire cargo information including at least information indicating, as coordinates, a position of a cargo loaded in a cargo compartment of a vehicle in the cargo compartment, wherein the controller is configured to:

record the cargo information related to the cargo newly loaded on the vehicle in association with a user when the new user boards the vehicle;

determine whether the cargo information has been updated;

determine whether the vehicle has arrived at a destination point of the user;

maintain a stopped state of the vehicle for a stop time in a case of determining that the vehicle has arrived at the destination point;

set the stop time in a case of determining that the cargo information has been updated as a first stop time; and set the stop time in a case of determining that the cargo information has not been updated as a second stop time, wherein the second stop time is set longer than the first stop time, and wherein the notifying unit is configured to notify a first alert in a case of determining that the cargo information has not been updated and the vehicle has arrived at the destination point.

2. The cargo compartment monitoring device according to claim 1, wherein the notifying unit notifies the first alert to an external of the vehicle.

3. The cargo compartment monitoring device according to claim 1, wherein the first alert indicates that the cargo is abandoned.

4. The cargo compartment monitoring device according to claim 1, wherein the controller determines whether a current time is after a notification start time, where the notification start time is a time earlier than a scheduled time at which the vehicle arrives at the destination point by a predetermined time, and wherein the notifying unit notifies the first alert in a case of determining that the cargo information has not been updated and the current time is after the notification start time.

5. The cargo compartment monitoring device according to claim 1, wherein the notifying unit notifies a second alert in a case of determining the cargo information has been updated and the vehicle has not arrived at the destination point.

6. The cargo compartment monitoring device according to claim 5, wherein the notifying unit notifies the second alert to an internal of the vehicle.

7. The cargo compartment monitoring device according to claim 5, wherein the second alert indicates that the cargo has moved.

8. The cargo compartment monitoring device according to claim 1, wherein the controller cancels the stopped state of the vehicle when the cargo information has not been updated during the second stop time, and the notifying unit notifies a third alert.

9. The cargo compartment monitoring device according to claim 8, wherein the third alert indicates that the cargo is abandoned.

10. The cargo compartment monitoring device according to claim 8, wherein the notifying unit notifies the third alert via a terminal of the user.

11. The cargo compartment monitoring device according to claim 1, wherein the controller determines whether the vehicle is stopped at a location other than the destination point, maintains the stopped state of the vehicle in a case of determining that the cargo information has been updated and the vehicle is stopped at a location other than the destination point, and the notifying unit notifies a fourth alert.

12. The cargo compartment monitoring device according to claim 11, wherein the fourth alert indicates that the cargo has moved.

13. A cargo compartment monitoring device comprising an acquiring unit, a controller, and a notifying unit, wherein the acquiring unit is configured to acquire cargo information including at least information indicating, as coordinates, a position of a cargo loaded in a cargo compartment of a vehicle in the cargo compartment, wherein the controller is configured to:

record the cargo information related to the cargo newly loaded on the vehicle in association with a user when the new user boards the vehicle;

determine whether the cargo information has been updated;

determine whether the vehicle has arrived at a destination point of the user;

wherein the notifying unit is configured to notify a first alert in a case of determining that the cargo information has not been updated and the vehicle has arrived at the destination point, wherein the controller is configured to:

determine whether the vehicle is stopped at a location other than the destination point; and maintain the stopped state of the vehicle in a case of determining that the cargo information has been updated and the vehicle is stopped at a location other than the destination point, wherein the notifying unit is configured to notify a fourth alert, wherein the acquiring unit is configured to acquire a return information indicating that the cargo has returned to the vehicle, and wherein the controller is configured to cancel the stopped state of the vehicle based on the return information.

14. The cargo compartment monitoring device according to claim 1, wherein the acquiring unit includes a plurality of load detecting sensors arranged on a floor of the cargo compartment, and acquires information, as coordinates, indicating the position based on a load distribution on the floor acquired by the load detecting sensors.

15. The cargo compartment monitoring device according to claim 1, wherein the acquiring unit includes a camera configured to capture an image of an inside of the cargo compartment and to generate a captured image, acquires information, as coordinates, indicating the position by image analysis based on the captured image.

16. The cargo compartment monitoring device according to claim 15, wherein the controller records the captured image in association with the cargo information and the user.

17. A cargo compartment monitoring method for controlling a controller connected to an acquiring unit and a notifying unit, the method comprising: by the controller, acquiring cargo information including at least information, as coordinates, indicating a position of a cargo loaded in a cargo compartment of a vehicle in the cargo compartment, via the acquiring unit;

recording the cargo information related to the cargo newly loaded on the vehicle in association with a user when the new user boards the vehicle;

determining whether the cargo information has been updated;

determining whether the vehicle has arrived at a destination point of the user;

maintaining a stopped state of the vehicle for a stop time in a case of determining that the vehicle has arrived at the destination point;

setting the stop time in a case of determining that the cargo information has been updated as a first stop time;

setting the stop time in a case of determining that the cargo information has not been updated as a second stop time, wherein the second stop time is set longer than the first stop time; and notifying a first alert via the notifying unit in a case of determining that the cargo information has not been updated and the vehicle has arrived at the destination point.

18. The cargo compartment monitoring method according to claim 17, further comprising: by the controller, notifying a second alert in a case of determining the cargo information has been updated and the vehicle has not arrived at the destination point.

19. The cargo compartment monitoring device according to claim 1, wherein the acquiring unit acquires the coordinates of the position of the cargo in the single cargo compartment.

* * * * *